April 16, 1929.  S. R. McFADDEN  1,709,534
CHAIN TIGHTENER
Filed July 3, 1928  3 Sheets-Sheet 1
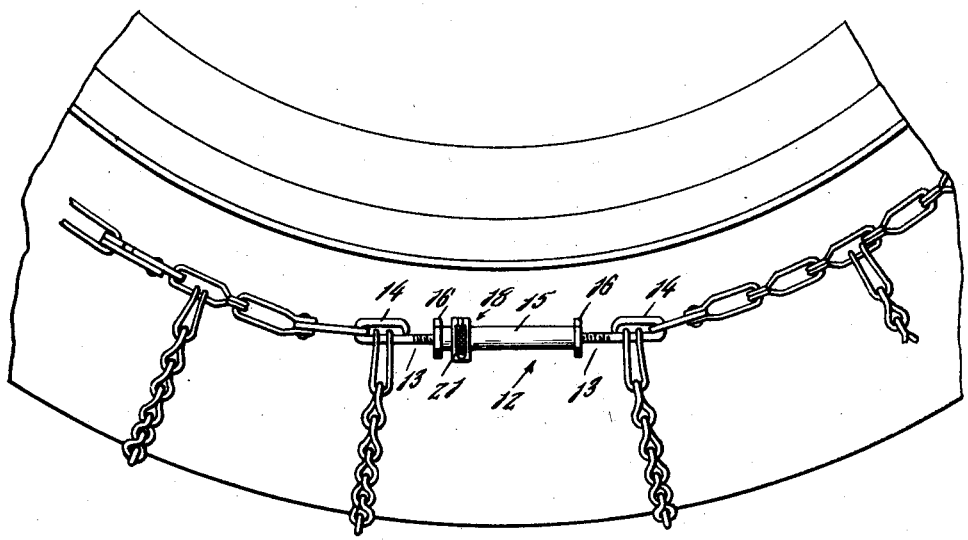
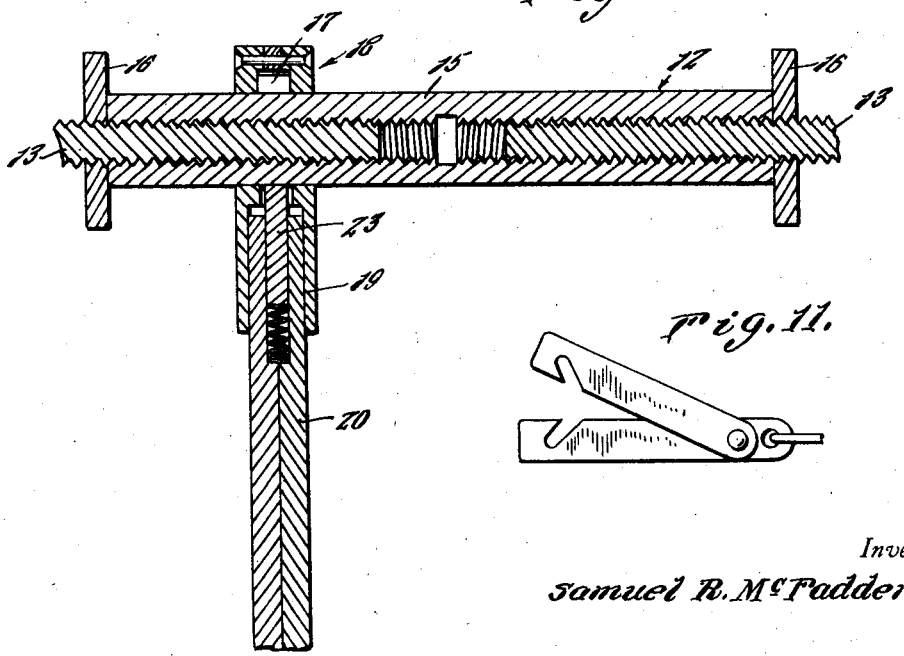
Inventor
Samuel R. McFadden
By Clarence A. O'Brien
Attorney

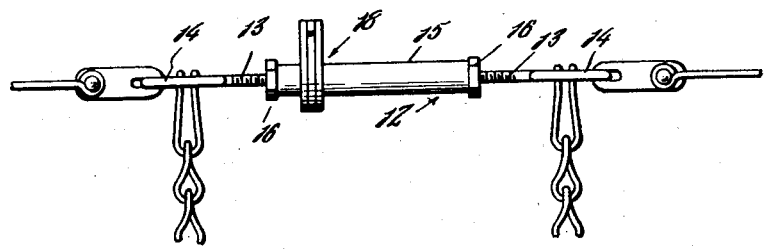
Fig. 2.
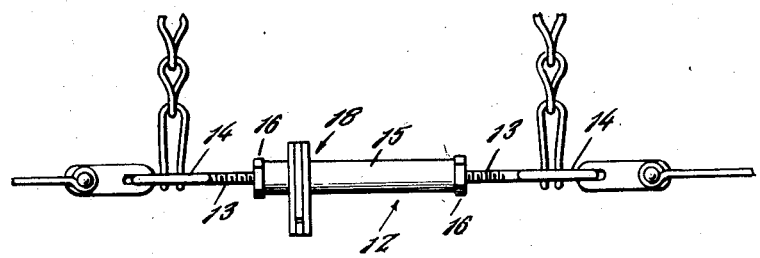
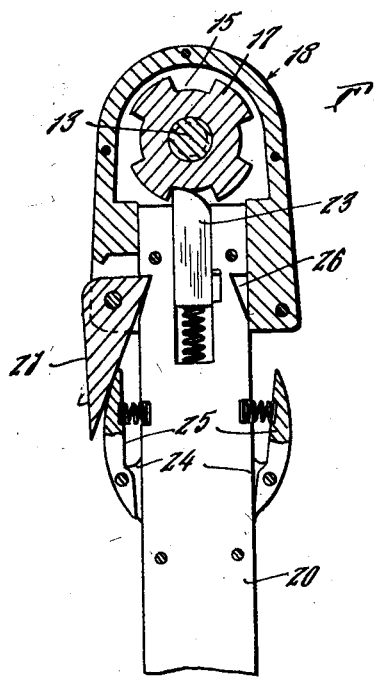
Fig. 4.
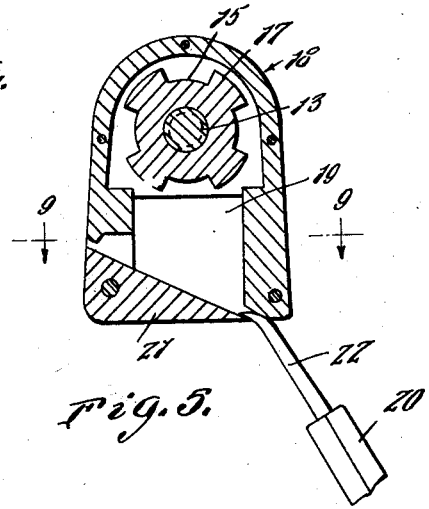
Fig. 5.
Inventor
Samuel R. McFadden
By Clarence A. O'Brien
Attorney April 16, 1929.  S. R. McFADDEN  1,709,534
CHAIN TIGHTENER
Filed July 3, 1928   3 Sheets-Sheet 3
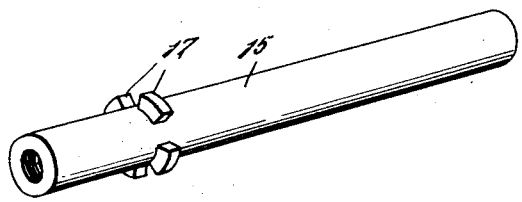
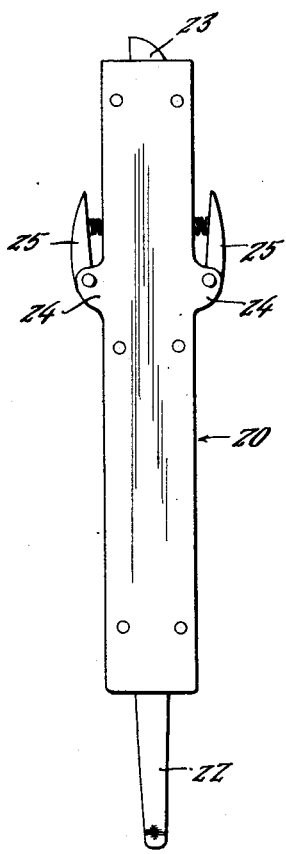
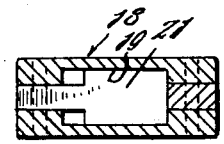
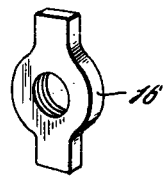
Inventor
Samuel R. McFadden
By Clarence A. O'Brien
Attorney Patented Apr. 16, 1929.

1,709,534

UNITED STATES PATENT OFFICE.

SAMUEL R. McFADDEN, OF MOUNDSVILLE, WEST VIRGINIA.

CHAIN TIGHTENER.

Application filed July 3, 1928. Serial No. 290,232.

The present invention relates to an improved chain tightener that is especially, but not necessarily, adapted for use in association with automobile tire chains. The device is in the form of a novel turn buckle and is constructed to be incorporated in circumferential side chains and it embodies a handy and convenient ratchet wrench structure for effecting an adjustment of the turn buckle.

One feature of the invention is the turn buckle per se, which embodies screw threaded bolts constructed for connection with the links of the side chains, together with a coupling member for the bolt provided with permanent ratchet means and a connecting device for the operating handle to cooperate with the ratchet means.

Another feature of the invention is the handle connecting device which is associated with the ratchet teeth on the turn buckle coupling member, this being in the form of a casing to completely house the ratchet teeth to protect them and to prevent the entrance of mud and extraneous matter so as to keep the teeth in good condition for efficient operation.

The ratchet housing and handle connecting member is also advantageous in that it embodies a pivoted closure, which has the additional function of a retaining pawl for holding the operating handle in place.

The operating handle itself is of novel construction in that it is especially constructed for cooperation with said handle connecting member, and because it is characterized by an arrangement of features for effecting a dependable connection between itself and the connecting member and for permitting the reversing so that the coupling member of the turn buckle could be turned in either direction.

Other features and advantages of the invention will become apparent from the following description and drawings.

In the drawings:

Figure 1 is a side elevational view of the tire chain embodying the turn buckle constructed in accordance with the present invention.

Figure 2 is a plan view showing two of the turn buckle structures embodied in the side chains of the tire chains.

Figure 3 is an enlarged sectional view showing the complete structure ready for operation.

Figure 4 is a view in section and elevation detailing the ratchet mechanism and showing the manner in which the handle is fastened to the connecting member.

Figure 5 is a view similar to Figure 4, showing the handle removed and indicating the manner in which the handle tongue is employed for opening the pivoted closure and retaining device, forming a part of the connecting member.

Figure 6 is a perspective view of the tubular coupling, constituting a part of the turnbuckle construction.

Figure 7 is an elevational view of the wrench handle per se.

Figure 8 is an edge elevational view of the same.

Figure 9 is a cross section taken approximately upon the plane of the line 9—9 of Figure 5.

Figure 10 is a perspective view of a lock nut.

Figure 11 is an elevational view of a chain fastener such as I employ.

Referring now to the drawings by numeral, it will be observed that the turn buckle is generally designated by the reference character 12. As before intimated it comprises substantially duplicate screw threaded bolts 13 having eyes 14 at their outer ends, connected with the links of the side and cross chains of the tire chain. Incidentally I employ two of these turn buckle devices, but it is unnecessary to describe but a single one of them, since they are identical in construction.

The screw threaded ends of the bolts 13 are connected with a tubular coupling 15, and I propose to employ lock nuts 16, for maintaining the bolts adjusted.

Referring to Figure 6, it will be seen that the coupling 15 is provided at one end with circumferentially spaced ratchet teeth 17, and as before indicated, these teeth are encased or enclosed in a handle connecting device 18.

Referring to Figures 4 and 5, it will be seen that this comprises a suitably shaped hand constructed casing which is rotatably mounted on the coupling 15 and thus permanently attached thereto. On one side this casing is formed with an opening 19 (see Figure 5) which is adapted for passage of one end portion of the wrench handle 20. Located at this end is a pivoted wedge shaped closure 21, which normally assumes the closed position shown in Figure 5. When, however, the handle is placed in position for use, it assumes the position shown in Figure 4, at which time, it operates as a retainer for the handle.

The handle 20, as shown in Figures 7 and 8 is of suitable construction, having a screw driver or prong 22, at one end, and a spring pressed ratchet engaging pawl 23, at the opposite end. Also near the last mentioned end it is formed on longitudinal edges with outstanding ears 24, between which spring pressed latches 25 are pivoted.

These latches cooperate with the aforesaid member 21 in holding it in handle retaining position as shown in Figure 4. As shown in Figures 4 and 8, the handle is formed on opposite sides with keeper recesses 26, for reception of the member 21. Under normal conditions, the turn buckle structure is incorporated in the side chains as shown in Figures 1 and 2, at which time the closing member of the part 18 is in closed position as shown in Figure 5. This member 18 therefore provides a complete casing or housing for the ratchet teeth to protect them and to prevent the accumulation of mud and dirt thereon. When it is desired to take up slack in the side chain, the handle 20 is brought into play as shown in Figure 5, at which time the screw driver or prong 22 is inserted under the member 21, thus swinging it out upon its pivot until it assumes the position shown in Figure 4. This uncovers the entrance 19 and allows the handle to be slipped into place as shown in Figure 4. When it is thus slipped into place, the member 21 snaps into the keeper seat 26, under the action of the retaining latch 25. Incidentally, the handle may be placed as shown in Figure 4 for placing the latch in one direction or may be turned over to dispose the pawl 23 in an opposite direction for turning the ratchet in an opposite direction. This is the reason for providing a double arrangement of latches 25 and keeper seats 26.

Obviously, with the handle in place as shown in Figure 4, the ratchet can be turned and the coupling 15 turned to take up slack in the chain. After the desired adjustment is made, the member 21 is simply pressed against the action of the spring pressed latch 25 in an obvious manner and the handle can then be slipped out and put away in a tool box.

The gist of the invention is in providing an especially constructed turn buckle incorporated in a side chain or the like, providing the coupling member of the turn buckle with the ratchet teeth, placing about these a rotary casing constructed for releasable connection of an operating handle and providing an operating handle with a spring pressed pawl for cooperation with the ratchet teeth to permit the ratchet to be turned in either direction for taking up or loosening the side chain.

A careful consideration of the description in connection with the drawing will enable persons skilled in the art to which the invention relates to obtain a clear understanding of the same. Therefore, a more lengthy description is regarded unnecessary.

Minor changes in the shape, size and arrangement of parts coming within the field of invention claimed, may be resorted to, if desired.

I claim:

A chain tightener comprising a turn buckle structure including a coupling having ratchet teeth formed thereon, a rotary casing on the coupling member embracing the ratchet teeth having an entrance on one side, and a pivoted closure for the entrance, a handle adapted to be attached through said entrance, said handle having spring pressed latches for cooperation with the pivoted closure, having keeper seats for cooperation with the pivoted closure, a spring pressed pawl for cooperation with the ratchet teeth.

In testimony whereof I affix my signature.

SAMUEL R. McFADDEN.